United States Patent
Zhuo et al.

(10) Patent No.: US 10,673,475 B1
(45) Date of Patent: Jun. 2, 2020

(54) TRANSMITTER USING HYBRID BEAMFORMING AND PERFORMING A CODE DIVISION FEEDBACK METHOD FOR DIGITAL PRE-DISTORTION

(71) Applicant: Industrial Technology Research Institute, Hsinchu (TW)

(72) Inventors: Wei-Cheng Zhuo, Changhua County (TW); Wei-Min Lai, Pingtung County (TW); Jia-Ming Chen, Taipei (TW); Jen-Yuan Hsu, Kinmen County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/600,574

(22) Filed: Oct. 14, 2019

(51) Int. Cl.
| | |
|---|---|
| H04K 1/02 | (2006.01) |
| H04L 25/03 | (2006.01) |
| H04L 25/49 | (2006.01) |
| H04B 1/04 | (2006.01) |
| H04B 7/06 | (2006.01) |
| H04L 27/36 | (2006.01) |
| H04B 7/0413 | (2017.01) |

(52) U.S. Cl.
CPC ......... *H04B 1/0483* (2013.01); *H04B 7/0413* (2013.01); *H04B 7/0617* (2013.01); *H04L 27/368* (2013.01); *H04B 2001/0425* (2013.01)

(58) Field of Classification Search
CPC .. H04B 1/0483; H04B 7/0617; H04B 7/0413; H04B 2001/0425; H04B 1/38; H04B 1/0475; H04B 15/00; H04L 27/368
USPC ........................................ 375/296, 297, 260
See application file for complete search history.

(56) References Cited

U.S. PATENT DOCUMENTS

| | | | |
|---|---|---|---|
| 10,560,140 B1 * | 2/2020 | Wu | H04B 1/38 |
| 2009/0184763 A1 | 7/2009 | Kim | |
| 2018/0219711 A1 * | 8/2018 | Laporte | H04B 7/0617 |
| 2019/0044585 A1 | 2/2019 | Shaked | |

(Continued)

FOREIGN PATENT DOCUMENTS

| | | |
|---|---|---|
| CN | 109617842 | 4/2019 |
| TW | I645689 | 12/2018 |

(Continued)

OTHER PUBLICATIONS

Xin Liu, et al., "Beam-Oriented Digital Predistortion for 5G Massive MIMO Hybrid Beamforming Transmitters", IEEE Transactions on Microwave Theory and Techniques, vol. 66, No. 7, Jul. 2018, pp. 3419-3432.

(Continued)

*Primary Examiner* — Phuong Phu
(74) *Attorney, Agent, or Firm* — JCIPRNET

(57) ABSTRACT

The disclosure provides a transmitter of a communication system using hybrid digital/analog beamforming and configured to perform digital pre-distortion (DPD). In an exemplary embodiment in accordance with the disclosure, the transmitter may generate a plurality of scrambling sequences. The transmitter may comprise a plurality of combining modules to receive a combined feedback signal. The transmitter may use the plurality of scrambling sequences to recover the signals output by the antenna arrays from the combined feedback signal. Thus, the transmitter may perform DPD for each antenna array.

8 Claims, 13 Drawing Sheets

(56) References Cited

U.S. PATENT DOCUMENTS

2019/0089389 A1* 3/2019 Gutman ............... H04B 1/0475
2020/0068570 A1* 2/2020 Khan ..................... H04B 15/00

FOREIGN PATENT DOCUMENTS

WO 2018067969 4/2018
WO 2018219466 12/2018

OTHER PUBLICATIONS

Seyed Aidin Bassam, et al., "Crossover Digital Predistorter for the Compensation of Crosstalk and Nonlinearity in MIMO Transmitters", IEEE Transactions on Microwave Theory and Techniques, vol. 57, No. 5, May 2009, pp. 1119-1128.

Sangil Lee, et al., "Digital Predistortion for Power Amplifiers in Hybrid MIMO Systems with Antenna Subarrays", 2015 IEEE 81st Vehicular Technology Conference (VTC Spring), Jul. 2, 2015, pp. 1-5.

Mahmoud Abdelaziz, et al., "Digital Predistortion for Hybrid MIMO Transmitters", IEEE Journal of Selected Topics in Signal Processing, vol. 12, No. 3, Jun. 2018, pp. 445-454.

Ling Liu, et al., "Single-PA-Feedback Digital Predistortion for Beamforming MIMO Transmitter", 2016 IEEE International Conference on Microwave and Millimeter Wave Technology (ICMMT), Dec. 1, 2016, pp. 1-3.

Hongmin Li, et al., "Forward Modeling Assisted Digital Predistortion Method for Hybrid Beamforming Transmitters with a Single PA Feedback" 2018 IEEE Asia Pacific Conference on Circuits and Systems, Oct. 2018, pp. 1-4.

Andreas F. Molisch, et al., "Hybrid Beamforming for Massive MIMO: A Survey", IEEE Communications Magazine, Sep. 2017, pp. 134-141.

* cited by examiner

TRANSMITTER USING HYBRID BEAMFORMING AND PERFORMING A CODE DIVISION FEEDBACK METHOD FOR DIGITAL PRE-DISTORTION

TECHNICAL FIELD

The disclosure is directed to a transmitter using hybrid beamforming and performing a code division feedback method for digital pre-distortion.

BACKGROUND 5G communication systems use massive multiple-input multiple-output (MIMO) technology and beamforming to provide higher data rates. Massive MIMO technology uses a very high number of antennas.

FIG. 1 illustrates an example of a massive MIMO system which uses beamforming. In FIG. 1, a next Generation Node B (gNB) transmits signals to several user equipment (UE). The gNB comprises a very high number of antennas. The antennas of the gNB are grouped into several antenna arrays. The gNB uses beamforming to transmit signals to the UEs. Similarly, the gNB receives signals from the UEs through the beams. The UEs access a network through the gNB. Since the gNB comprises a very high number of antennas, the gNB may provide higher data rates and have a higher beamforming gain.

FIG. 2 illustrates an example of a transmitter of a massive MIMO system which uses all-digital beamforming. In FIG. 2, the transmitter inputs Ns baseband signals to a baseband precoding block. The baseband precoding block outputs Lt precoded signals. The precoded signals are the inputs of Lt digital-to-analog converters (DAC). The Lt outputs of the DACs are the inputs of Lt radio frequency (RF) chains. The Lt outputs of the RF chains are transmitted through the Nt antennas of the transmitter. Similar to FIG. 1, the transmitter of FIG. 2 also uses beamforming. The baseband precoding block performs precoding in order to transmit the precoded signals in different beams.

All-digital beamforming has the following disadvantages: signal processing has high computational complexity; and high power consumption.

FIG. 3 illustrates an example of a transmitter of a massive MIMO system which uses hybrid digital/analog beamforming. Hybrid beamforming performs precoding in the digital domain and in the analog domain. Similar to FIG. 2, the transmitter inputs Ns baseband signals to a baseband precoding block. The baseband precoding block performs precoding in digital domain. The baseband precoding block outputs Lt precoded signals. The precoded signals are the inputs of Lt DACs. The Lt outputs of the DACs are the inputs of Lt RF chains. However, different from FIG. 2, in FIG. 3, the Lt outputs of the RF chains are the inputs of a RF precoding block. The RF precoding block performs precoding in the analog domain. The RF precoding block outputs Nt precoded signals, which are transmitted through the Nt antennas of the transmitter.

Comparing FIGS. 2-3, the number of baseband signals Ns is less than or equal to the number of RF chains Lt: Ns≤Lt. In FIG. 2, the number of RF chains Lt equals the number of antennas Nt: Lt=Nt. However, in FIG. 3, since hybrid beamforming has RF precoding, the number of RF chains Lt may be less than the number of antennas Nt: Lt<Nt.

In hybrid beamforming, the number of RF chains may be less than the number of antennas. Thus, hybrid beamforming may require fewer RF chains, while maintaining high beamforming gain and diversity order. Since hybrid beamforming may require fewer RF chains, hybrid beamforming may reduce the production cost of massive MIMO systems.

FIG. 4 illustrates an example of a transmitter which uses digital pre-distortion. In FIG. 4, the transmitter includes power amplifier (PA), a digital pre-distortion (DPD) module and a DPD adapter. The transmitter receives input x(n). The transmitter outputs y(n). Since the power amplifier causes distortion of output y(n), the transmitter uses DPD to cancel the distortion. The DPD module performs DPD on x(n) and outputs a pre-distorted signal to the PA and the DPD adapter. PA amplifies the pre-distorted signal and outputs y(n). The DPD adapter is coupled to the output of the PA to receive y(n) as a feedback signal. Since the DPD adapter receives the input and the output of the PA, the DPD adapter may estimate the distortion caused by the PA on y(n). After estimating the distortion, the DPD adapter may adjust the DPD module in order to cancel the distortion.

Power amplifiers are indispensable components of a communication system. Power amplifiers affect the overall performance and throughput of the communication system. However, power amplifiers are inherently non-linear. Thus, power amplifiers also cause the following problems: spectral re-growth; adjacent channel interference and out-of-band emissions; and in-band distortion. Therefore, communication systems require DPD to correct these problems.

The DPD adapter may use a model for the power amplifier (PA). The model may be the one shown in the following equation:

$$y(n) = \sum_{k=1} \sum_{q=0} c_{kq} x(n-q) |x(n-q)|^{k-1}$$

Coefficients "c" represent the response of the PA. During PA model training, the DPD adapter may input known signals x(n) into the PA. The DPD adapter may receive the output y(n) of the PA. The DPD adapter may estimate the coefficients "c" with the following equation: $c=(x^*x)^{-1}x^*y$. $x^*$ is the complex conjugate of the input signal x. $(x^*x)$ is the autocorrelation of the input signal x.

FIG. 5 illustrates an example of distortion suppression by digital pre-distortion. The transmitter may receive a signal. At the left of FIG. 5, FIG. 5 shows the original transmit signal spectrum. In the example of FIG. 5, the original transmit signal spectrum is a square spectrum occupying a frequency band. First, the transmitter may perform DPD at the DPD module. Then, the predistorted signal is input into the PA. The output of the PA is shown as a solid line. However, the impairments of the PA distort the spectrum, both inside the original frequency and outside the original frequency band. FIG. 5 also shows an example of the transmit signal spectrum if the transmitter does not perform DPD, which is shown as a dashed line. In FIG. 5, if the transmitter does not perform DPD, the PA would distort the spectrum of the original frequency band. In other words, the PA would cause in-band distortion. Moreover, the PA would distort and spread the signal outside of the original band. In other words, the PA would cause spectral re-growth and out-of-band emissions. Thus, in FIG. 5, DPD suppresses spurious spectrum, represented by the arrows from the dashed line to the solid line. DPD reduces spectral re-growth, out-of-band emissions, and in-band distortion.

Due to the benefits described above, employing DPD in a massive MIMO system is desired. However, DPD in a massive MIMO system also presents particular challenges.

In a DPD method for a system with a single antenna, each amplifier requires a digital chain. Each digital chain comprises a DPD module and a feedback circuit. In a system with many antenna arrays, the number of power amplifiers is much higher, and DPD would require a very high number of digital chains.

Furthermore, in systems with antenna arrays, each digital chain is coupled to an antenna array. Several power amplifiers output signals to the antenna array. Since the number of power amplifiers is very high, it is desirable that DPD is performed for a feedback signal which combines the outputs of several power amplifiers. In DPD for conventional systems, a combined feedback signal is not needed since the number of antennas is not high.

The disclosure is directed to a transmitter with many antenna arrays using hybrid beamforming and DPD. The transmitter of the disclosure may comprise one single feedback circuit that may combine the feedback signals from the antenna arrays into one combined feedback signal. The feedback circuit is able to recover the signals output by the antenna arrays because the feedback circuit performs a code division method. Thus, the transmitter of the disclosure may perform DPD while reducing feedback circuit hardware complexity and cost.

SUMMARY OF THE DISCLOSURE

Accordingly, to address the above described difficulty, the disclosure provides a transmitter of a communication system using hybrid digital/analog beamforming and configured to perform digital pre-distortion (DPD). The transmitter may generate a plurality of orthogonal scrambling sequences or a plurality of scrambling sequences with low cross-correlation. The transmitter may use the plurality of scrambling sequences to recover the signals output by the antenna arrays from the combined feedback signal. Thus, the transmitter may perform DPD for each antenna array.

In an aspect, the disclosure is directed to a transmitter of a communication system using hybrid digital/analog beamforming, configured to perform a code division feedback method for digital pre-distortion (DPD), the transmitter comprising: a processor, outputting a plurality of digital baseband signals; a plurality of digital-to-analog converters (DAC), coupled to the processor, receiving the plurality of digital baseband signals and outputting a plurality of analog baseband signals; a plurality of mixers, coupled to the plurality of DACs, receiving the plurality of analog baseband signals, performing frequency upconversion, and outputting a plurality of upconverted signals; a plurality of power amplifiers, amplifying the plurality of upconverted signals, and outputting a plurality of transmit signals, wherein the plurality of power amplifiers causes distortion of the plurality of transmit signals; a plurality of antenna arrays, coupled to the plurality of power amplifiers, receiving the plurality of transmit signals, and transmitting the plurality of transmit signals; a plurality of combining modules, coupled to the plurality of antenna arrays, receiving the plurality of transmit signals, combining the plurality of transmit signals, and outputting a combined feedback signal; and a receiver chain, coupled to the plurality of combining modules, receiving the combined feedback signal, converting the combined feedback signal to a digital feedback signal, and outputting the digital feedback signal to the processor, wherein the processor is configured to execute a plurality of modules, the plurality of modules comprising: a plurality of DPD modules, performing DPD on the plurality of digital baseband signals to compensate the distortion caused by the plurality of power amplifiers; a DPD adaptation module, receiving the digital feedback signal, and adjusting the DPD performed by the plurality of DPD modules; a controller, controlling the DPD adaptation module; and a plurality of coding modules, receiving a plurality of scrambling sequences from the controller, wherein a coding module of the plurality of coding modules multiplies a digital baseband signal of the plurality of digital baseband signals by a scrambling sequence of the plurality of scrambling sequences, and the plurality of coding modules outputs the plurality of digital baseband signals after performing multiplication, wherein the DPD adaptation module computes the plurality of transmit signals from the digital feedback signal into different components according to the plurality of scrambling sequences and executes DPD processing for each digital baseband signal of the plurality of digital baseband signals, wherein the number of digital baseband signals equals the number of antenna arrays.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also, the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
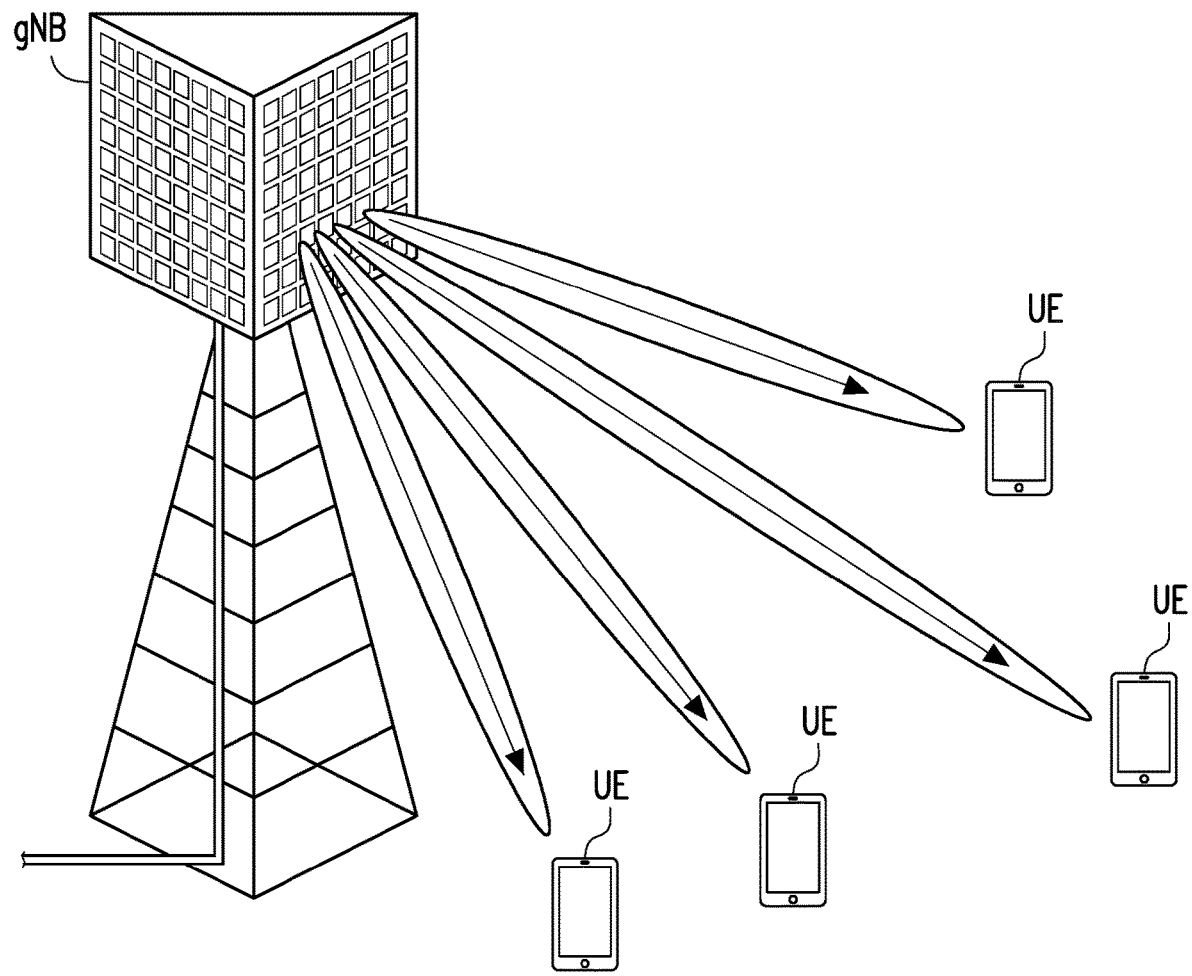
FIG. 1 illustrates an example of a massive MIMO system which uses beamforming.
Figure 2:
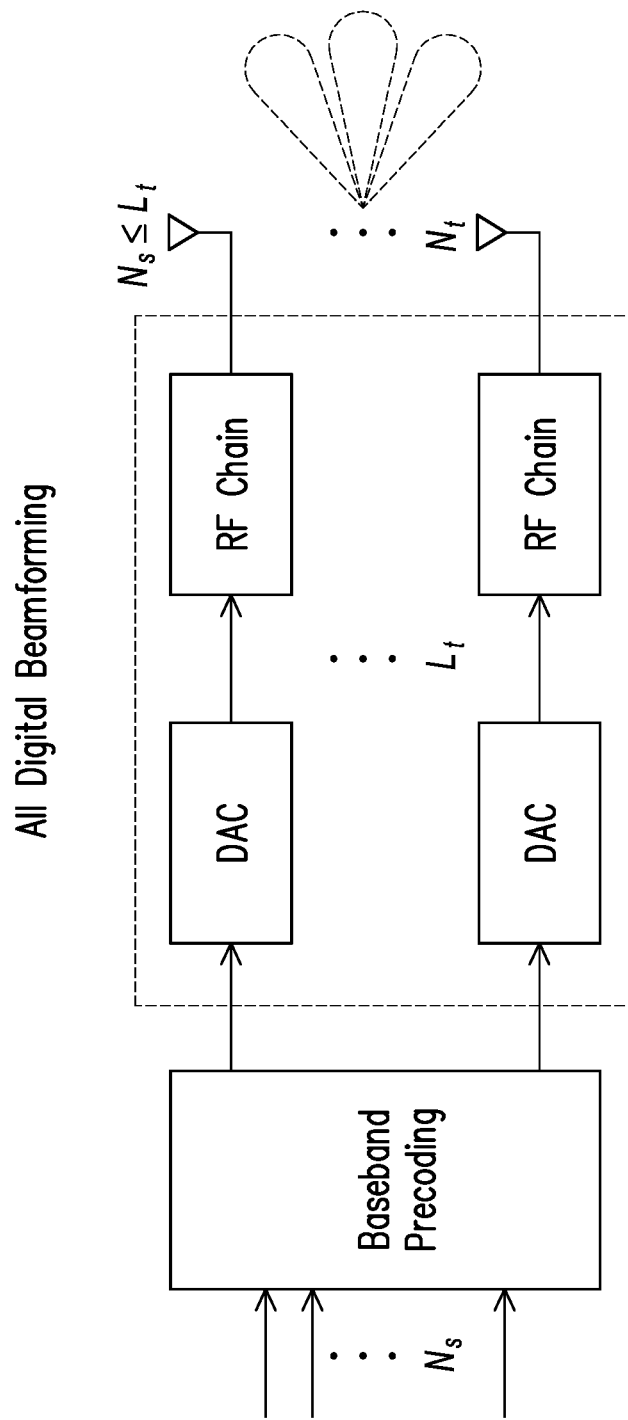
FIG. 2 illustrates an example of a transmitter of a massive MIMO system which uses all-digital beamforming.
Figure 3:
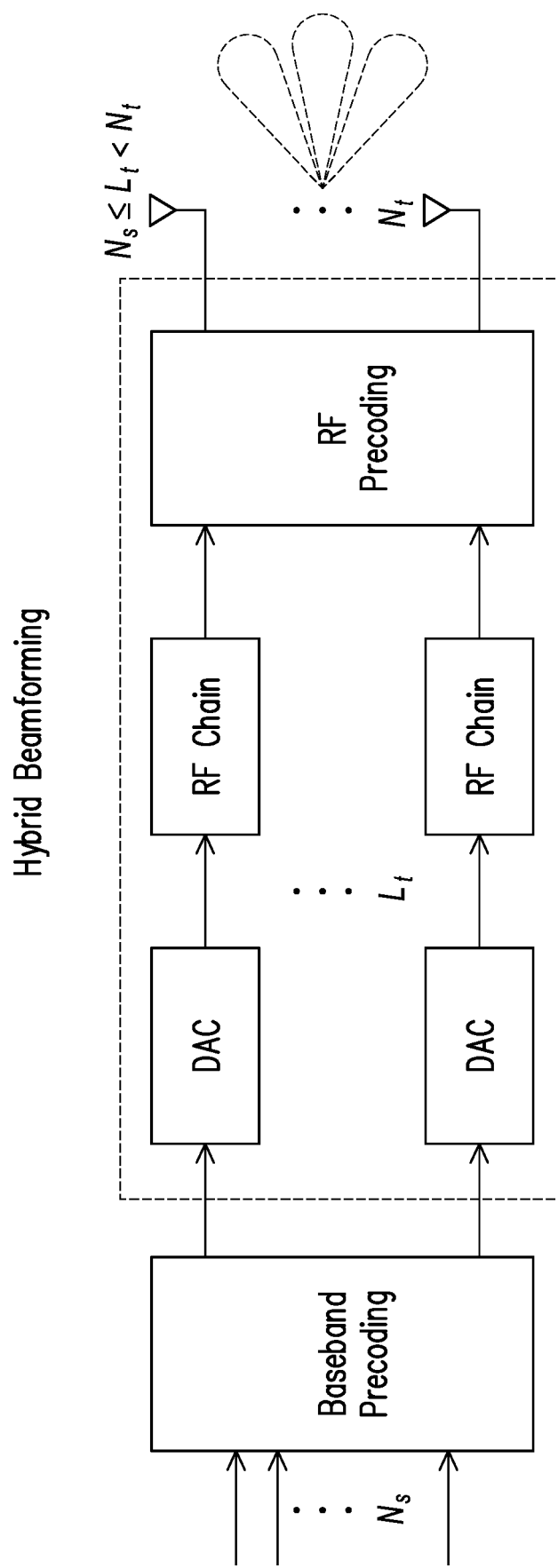
FIG. 3 is an example of a transmitter of a massive MIMO system which uses hybrid digital/analog beamforming.
Figure 4:
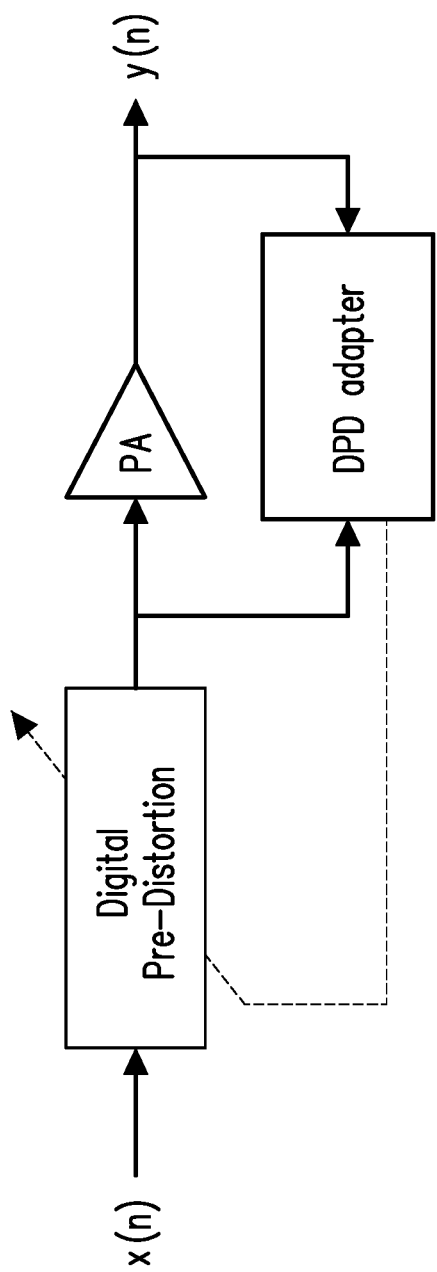
FIG. 4 illustrates a transmitter which uses digital pre-distortion.
Figure 5:
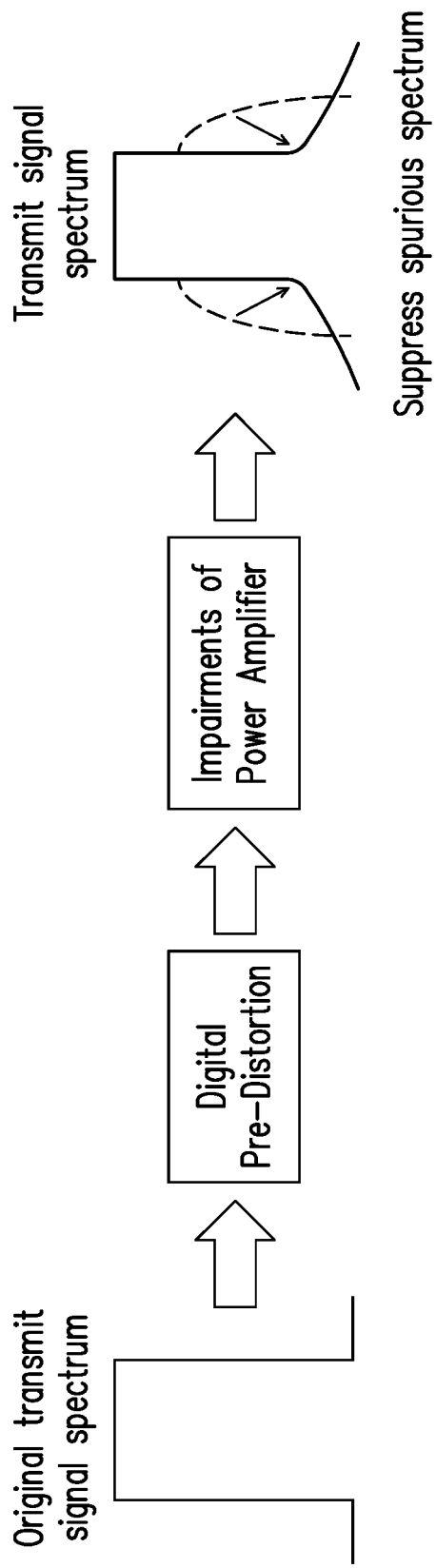
FIG. 5 illustrates an example of distortion suppression by digital pre-distortion.

Reference will now be made in detail to the present exemplary embodiments of the disclosure, examples of which are illustrated in the accompanying drawings. Wherever possible, the same reference numbers are used in the drawings and the description to refer to the same or like parts.

Figure 6:
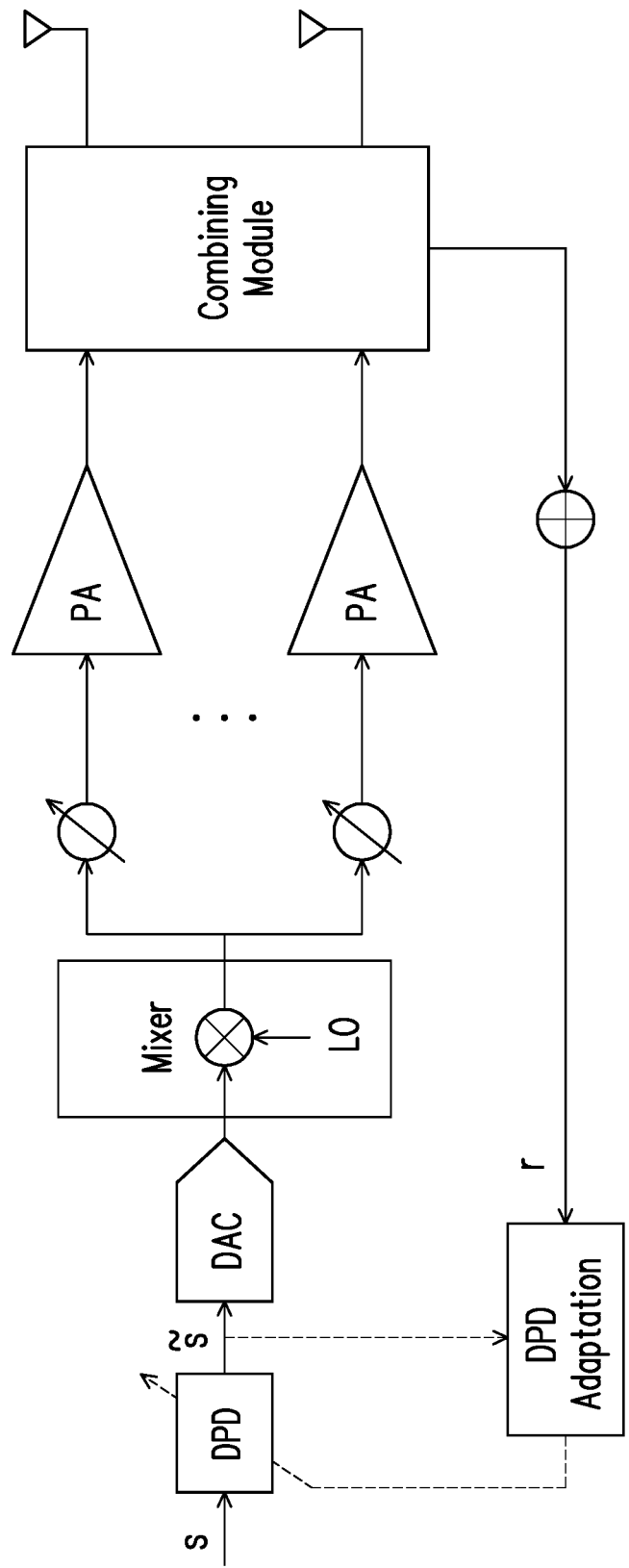
FIG. 6 illustrates an example of a transmitter which may use DPD.

Accordingly, to address the above described difficulty, the disclosure provides a transmitter using hybrid beamforming and performing a code division feedback method for digital pre-distortion. FIG. 6 and the corresponding description illustrates the computations performed by a digital pre-distortion (DPD) adaptation module of the transmitter. The DPD adaptation may perform these computations to cancel distortion.

FIG. 6 illustrates an example of a transmitter which may use DPD. In FIG. 6, the transmitter may comprise a DPD module, a digital-to-analog converter (DAC), a mixer, a plurality of coding modules, a plurality of power amplifiers (PA) which output transmit signals to an antenna array, a combining module, and a DPD adaptation module. A digital signal s may be input to the DPD module. The DPD module may output a predistorted signal $\tilde{s}$. The predistorted signal $\tilde{s}$ may be input to the DAC. The DAC may output an analog signal. The mixer may perform frequency upconversion of the analog signal according to the frequency of a local oscillator (LO). The analog signal may then be coded by the plurality of coding modules. The coded analog signals of the plurality of coding modules may be input to the plurality of PAs. The plurality of PAs may amplify the coded analog signals. The transmitter may transmit the signals output by the plurality of PAs through the antenna array.

The combining module may combine the signals transmitted by the antenna array into one combined signal. The combining module may input the combined signal into the DPD adaptation module as feedback signal r. The DPD adaptation module may also receive the predistorted signal $\tilde{s}$ in order to adjust the DPD module. Given a composite PA response p, the feedback signal r may be expressed as r=ps. Thus, p may be computed as $p=(s^*s)^{-1}s^*r$. $s^*$ is the complex conjugate of the input signal s. $(s^*s)$ is the autocorrelation of the input signal s. After obtaining p, the DPD adaptation module may adjust the DPD module to cancel the distortion.

Moreover, the DAC, the mixer and the plurality of PAs may be analog circuits, which are well known by one skilled in the art.

Figure 7:
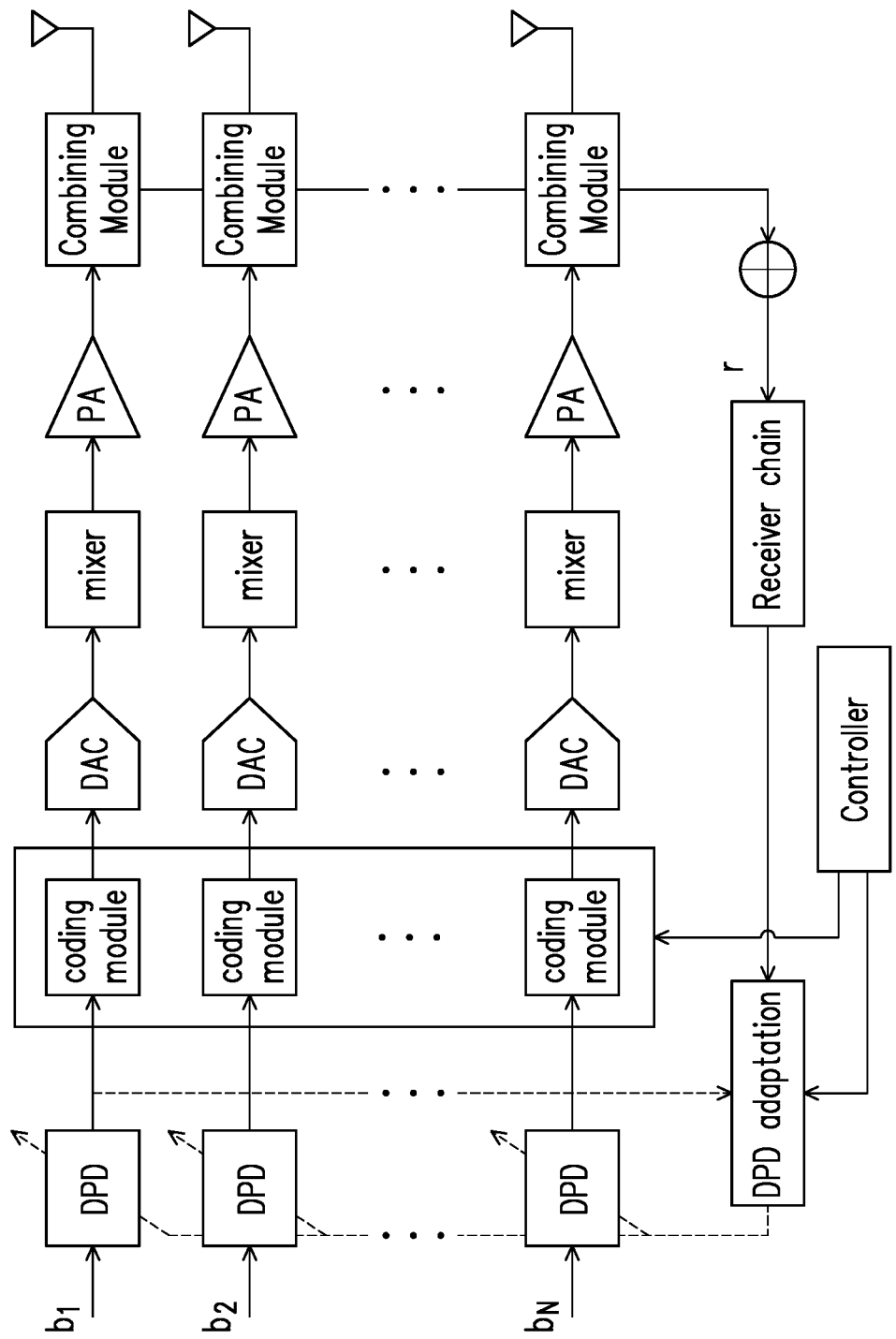
FIG. 7 illustrates a transmitter of a communication system using hybrid digital/analog beamforming, configured to perform a code division feedback method for digital pre-distortion DPD according to one of the exemplary embodiments of the disclosure.

FIG. 7 illustrates a transmitter of a communication system using hybrid digital/analog beamforming, configured to perform a code division feedback method for digital pre-distortion DPD according to one of the exemplary embodiments of the disclosure. In FIG. 7, the transmitter may comprise: a plurality of DPD modules; a plurality of coding modules; a plurality of DACs; a plurality of mixers; a plurality of PAs; a plurality of antenna arrays; a plurality of combining modules; a receiver chain; a DPD adaptation module; and a controller.

The plurality of DPD modules may receive a plurality of digital baseband signals b1, b2, . . . , bN, and perform DPD on the plurality of digital baseband signals. A coding module of the plurality of coding modules may multiply a digital baseband signal of the plurality of digital baseband signals by a scrambling sequence of a plurality of scrambling sequences. The plurality of coding modules may output the plurality of digital baseband signals after performing multiplication. The plurality of DACs may receive the plurality of digital baseband signals and output a plurality of analog baseband signals. The plurality of mixers may receive the plurality of analog baseband signals, perform frequency upconversion, and output a plurality of upconverted signals. The plurality of PAs may amplify the plurality of upconverted signals. The plurality of PAs may cause distortion of the plurality of transmit signals and output a plurality of transmit signals. The plurality of antenna arrays may receive the plurality of transmit signals from the plurality of PAs, and transmit the plurality of transmit signals.

The plurality of combining modules may receive the plurality of transmit signals from the plurality of antenna arrays, combine the plurality of transmit signals, and output a combined feedback signal r. The receiver chain may receive the combined feedback signal r, convert the combined feedback signal r to a digital feedback signal, and output the digital feedback signal. The DPD adaptation module may receive the plurality of digital baseband signals output by the plurality of DPD modules. The DPD adaptation module may further receive the digital feedback signal, and adjust the DPD performed by the plurality of DPD modules. The controller may control the DPD adaptation module, and output the plurality of scrambling sequences to the plurality of coding modules.

The DPD adaptation module may compute the plurality of transmit signals from the digital feedback signal according to the plurality of scrambling sequences. Thus, the DPD adaptation module may adjust the plurality of DPD modules according to the plurality of digital baseband signals output by the plurality of DPD modules and the plurality of transmit signals.

Furthermore, the plurality of combining modules may be a plurality of analog circuits coupled to the antenna arrays. For example, the combining modules may be analog circuits which may add the signals transmitted by the antenna arrays to provide the combined feedback signal. Additionally, an antenna array of the plurality of antenna arrays may include one or multiple antennas to transmit and receive omni-directional antenna beams or directional antenna beams.

Figure 8:
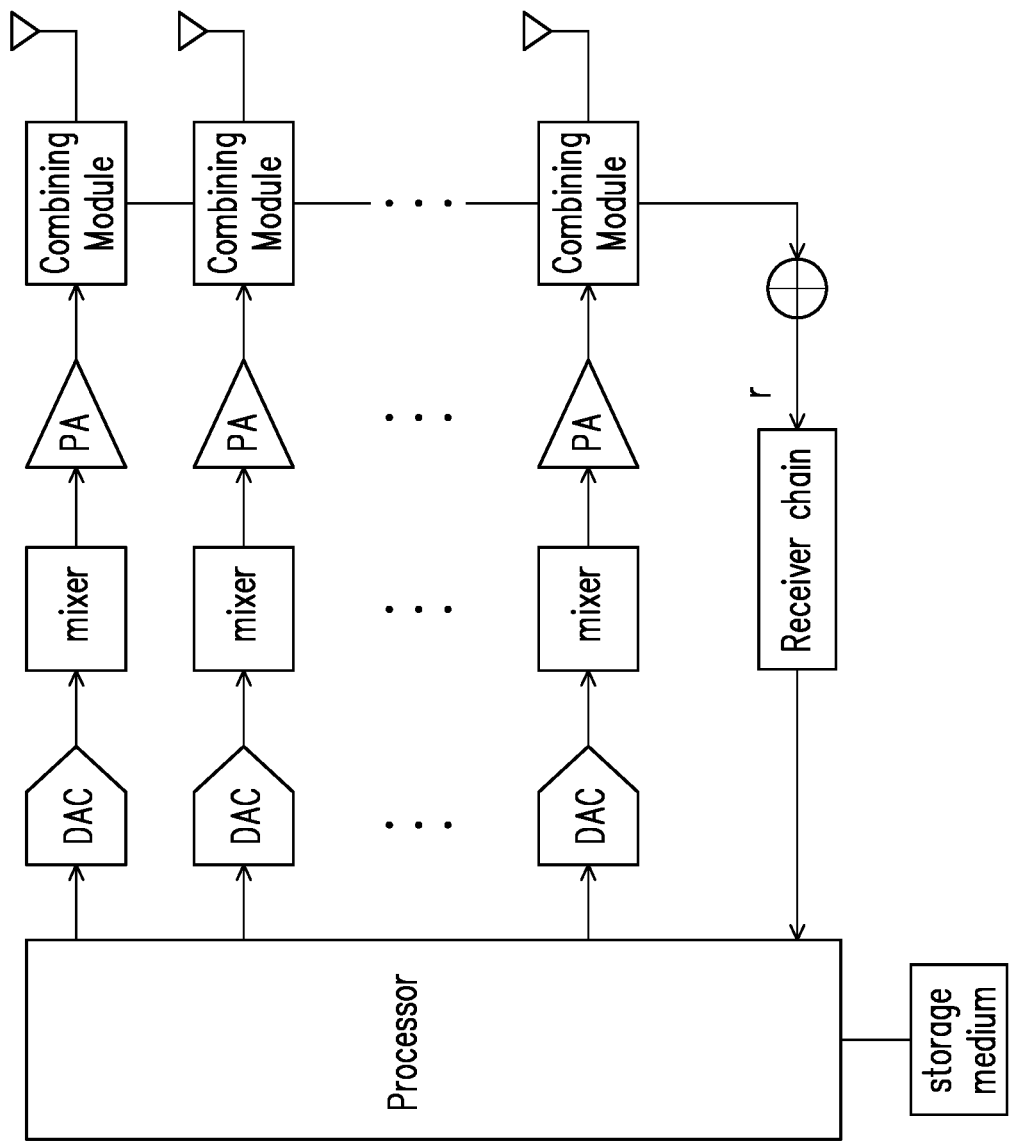
FIG. 8 illustrates a transmitter of a communication system using hybrid digital/analog beamforming, configured to perform a code division feedback method for digital pre-distortion DPD according to one of the exemplary embodiments of the disclosure.

FIG. 8 illustrates a transmitter of a communication system using hybrid digital/analog beamforming, configured to perform a code division feedback method for digital pre-distortion DPD according to one of the exemplary embodiments of the disclosure. In FIG. 8, the transmitter may comprise: a hardware processor, a non-transitory storage medium, a plurality of DACs; a plurality of mixers; a plurality of PAs; a plurality of antenna arrays; a plurality of combining modules; and a receiver chain.

The plurality of DACs, the plurality of mixers, the plurality of PAs, the plurality of antenna arrays, the plurality of combining modules, and the receiver chain are similar to those in FIG. 7. Description of these components may be found in the description of FIG. 7.

FIG. 8 is different from FIG. 7 since the transmitter of FIG. 8 comprises a hardware processor and a non-transitory storage medium. The hardware processor is electrically connected to the non-transitory storage medium and configured at least to execute a plurality of modules of the transmitter according to the exemplary embodiments and alternative variations. The hardware processor may be configured to at least execute the plurality of DPD modules, the plurality of coding modules, the DPD adaptation module, and the controller. Description of these modules and components executed by the hardware processor may be found in the description of FIG. 7.

Furthermore, the hardware processor 901 is configured to process digital signals and to at least execute the plurality of modules of the transmitter in accordance with the proposed exemplary embodiments of the disclosure. Also, the hardware processor may access to the non-transitory storage medium which stores programming codes, codebook configurations, buffered data, and record configurations assigned by the hardware processor. The hardware processor 901 could be implemented by using programmable units such as a micro-processor, a micro-controller, a DSP chips, FPGA, etc. The functions of the hardware processor may also be implemented with separate electronic devices or ICs. It should be noted that the functions of hardware processor may be implemented with either hardware or software.

Thus, FIGS. 7 and 8 jointly illustrate a transmitter of a communication system using hybrid digital/analog beamforming, configured to perform a code division feedback method for digital pre-distortion (DPD), the transmitter comprising: a processor, outputting a plurality of digital baseband signals; a plurality of digital-to-analog converters (DAC), coupled to the processor, receiving the plurality of digital baseband signals and outputting a plurality of analog baseband signals; a plurality of mixers, coupled to the plurality of DACs, receiving the plurality of analog baseband signals, performing frequency upconversion, and outputting a plurality of upconverted signals; a plurality of power amplifiers, amplifying the plurality of upconverted signals, and outputting a plurality of transmit signals, wherein the plurality of power amplifiers causes distortion of the plurality of transmit signals; a plurality of antenna arrays, coupled to the plurality of power amplifiers, receiving the plurality of transmit signals, and transmitting the plurality of transmit signals; a plurality of combining modules, coupled to the plurality of antenna arrays, receiving the plurality of transmit signals, combining the plurality of transmit signals, and outputting a combined feedback signal; and a receiver chain, coupled to the plurality of combining modules, receiving the combined feedback signal, converting the combined feedback signal to a digital feedback signal, and outputting the digital feedback signal to the processor, wherein the processor is configured to execute a plurality of modules, the plurality of modules comprising: a plurality of DPD modules, performing DPD on the plurality of digital baseband signals to compensate the distortion caused by the plurality of power amplifiers; a DPD adaptation module, receiving the digital feedback signal, and adjusting the DPD performed by the plurality of DPD modules; a controller, controlling the DPD adaptation module; and a plurality of coding modules, receiving a plurality of scrambling sequences from the controller, wherein a coding module of the plurality of coding modules multiplies a digital baseband signal of the plurality of digital baseband signals by a scrambling sequence of the plurality of scrambling sequences, and the plurality of coding modules outputs the plurality of digital baseband signals after performing multiplication, wherein the DPD adaptation module computes the plurality of transmit signals from the digital feedback signal according to the plurality of scrambling sequences and executes DPD processing for the plurality of digital baseband signals, wherein the number of digital baseband signals equals the number of antenna arrays.

According to one of the exemplary embodiments of the disclosure, the controller of FIG. 7 may output a plurality of Hadamard sequences or Walsh sequences to the plurality of coding modules. Thus, in this embodiment, the plurality of scrambling sequences is a plurality of Hadamard sequences or Walsh sequences.

According to one of the exemplary embodiments of the disclosure, the DPD adaptation module of FIG. 7 may compute the plurality of transmit signals from the digital feedback signal according to a plurality of orthogonal scrambling sequences, and further generate a DPD compensation signal. Thus, in this embodiment, the DPD adaptation module computes the plurality of transmit signals from the digital feedback signal according to a plurality of orthogonal scrambling sequences, and generates DPD compensation signal.

In another one of the exemplary embodiments of the disclosure, the combined feedback signal may be transformed to beam domain for processing.

Figure 9:
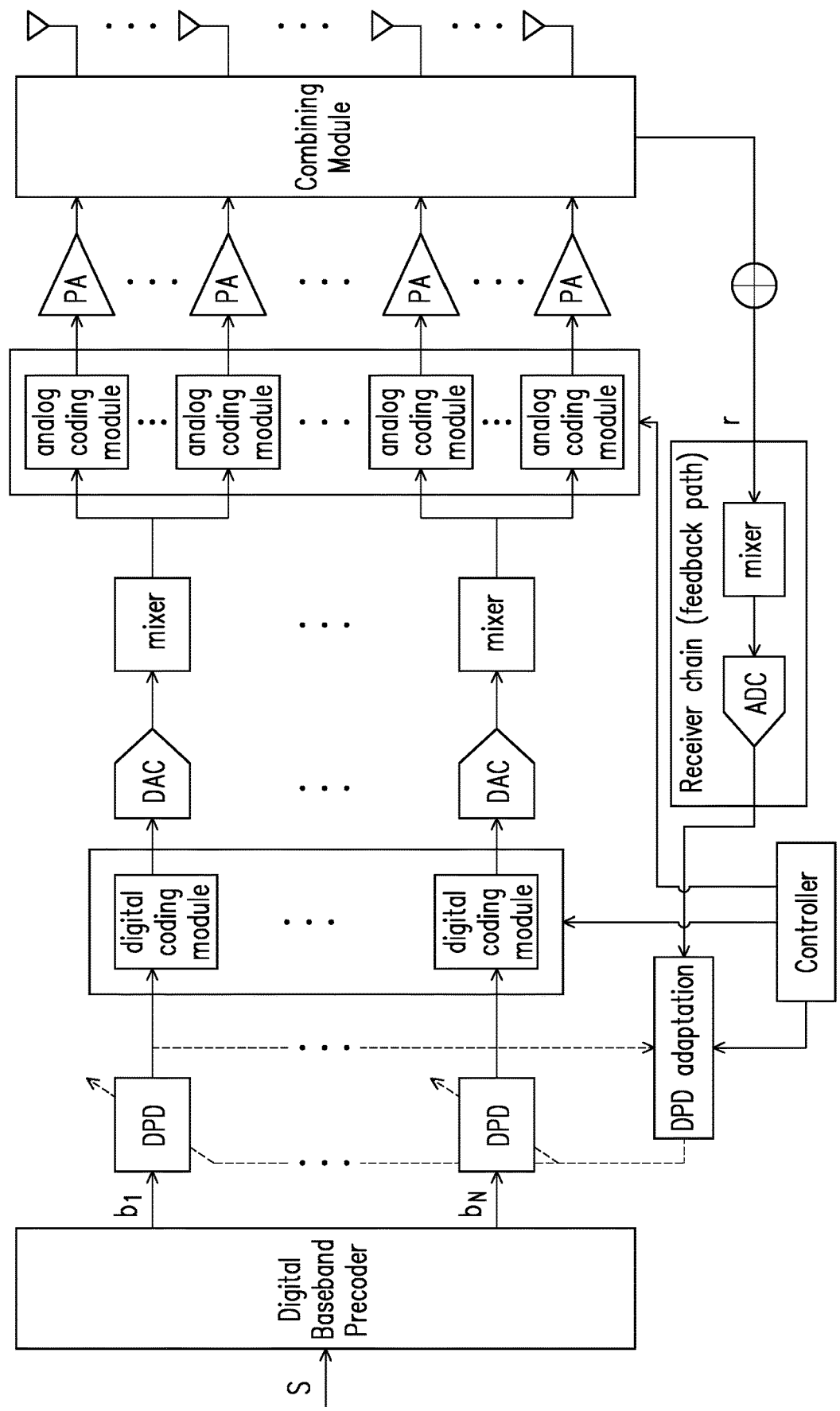
FIG. 9 illustrates a transmitter of a communication system using hybrid digital/analog beamforming, configured to perform a code division feedback method for digital pre-distortion DPD according to one of the exemplary embodiments of the disclosure.

FIG. 9 illustrates a transmitter of a communication system using hybrid digital/analog beamforming, configured to perform a code division feedback method for digital pre-distortion DPD according to one of the exemplary embodiments of the disclosure. In FIG. 9, the transmitter may comprise: a digital baseband precoder; a plurality of DPD modules; a plurality of digital coding modules; a plurality of DACs; a plurality of mixers; a plurality of analog coding modules; a plurality of PAs; a plurality of antenna arrays; a combining module; a receiver chain; a DPD adaptation module; and a controller.

Digital baseband signal s is input to the digital baseband precoder. The digital baseband precoder outputs a plurality of precoded baseband signals b1, b2, . . . , bN. The plurality of DPD modules may receive the plurality of precoded baseband signals b1, b2, . . . , bN, and perform DPD on b1, b2, . . . , bN. A digital coding module of the plurality of digital coding modules may multiply a precoded baseband signal of the plurality of precoded baseband signals by a scrambling sequence of a plurality of scrambling sequences. The plurality of coding modules may output the plurality of precoded baseband signals after performing multiplication. The plurality of DACs may receive the plurality of precoded baseband signals and output a plurality of analog baseband signals. The plurality of mixers may receive the plurality of analog baseband signals, perform frequency upconversion, and output a plurality of upconverted signals. The plurality of analog coding modules may receive the plurality of upconverted signals and perform analog coding. After analog coding, the plurality of PAs may amplify the plurality of upconverted signals. The plurality of PAs may cause distortion of the plurality of transmit signals and output a plurality of transmit signals. The plurality of antenna arrays may receive the plurality of transmit signals from the plurality of PAs, and transmit the plurality of transmit signals.

The combining module may receive the plurality of transmit signals from the plurality of antenna arrays, combine the plurality of transmit signals, and output a combined feedback signal r. The receiver chain may comprise a mixer and an analog-to-digital converter (ADC). The receiver chain may receive the combined feedback signal r. The mixer may perform frequency downconversion on the combined feedback signal r. After frequency downconversion, the ADC converts the combined feedback signal r to a digital feedback signal, and output the digital feedback signal. The DPD adaptation module may receive the plurality of precoded baseband signals output by the plurality of DPD modules. The DPD adaptation module may further receive the digital feedback signal, and adjust the DPD performed by the plurality of DPD modules.

Thus, in one of the exemplary embodiments of the disclosure, the receiver chain comprises: a mixer, receiving the combined feedback signal to perform frequency downconversion; and an analog-to-digital converter (ADC), receiving, from the mixer, the combined feedback signal after downconversion to convert into the digital feedback signal, and outputting the digital feedback signal.

The controller may control the DPD adaptation module, output the plurality of scrambling sequences to the plurality of digital coding modules, and adjust the plurality of analog coding modules. Thus, the controller may perform a two-layered coding. The controller may control the plurality of digital coding modules to perform the first layer of coding. The controller may further control the plurality of analog coding modules to perform the second layer of coding. The first layer of coding may be a first layer of a scrambling sequence. The second layer of coding may be a second layer of a scrambling sequence.

The DPD adaptation module may compute the plurality of transmit signals from the digital feedback signal according to the plurality of scrambling sequences and analog coding performed by the plurality of analog coding modules. Thus, the DPD adaptation module may adjust the plurality of DPD modules according to the plurality of precoded baseband signals output by the plurality of DPD modules and the plurality of transmit signals. The DPD adaptation module may adjust the plurality of DPD modules to provide DPD compensation for each antenna array. Additionally, the combined feedback signal r may be transformed into beam-oriented DPD for DPD compensation.

In one of the exemplary embodiments of the disclosure, the transmitter of FIG. 8 may further comprise a plurality of analog coding modules, and the plurality of coding modules may be a plurality of digital coding modules. Thus, in this embodiment, a plurality of digital coding modules is the plurality of coding modules, and the transmitter further comprises: a plurality of analog coding modules, coupled to the mixers, performing analog coding on the plurality of upconverted signals, and outputting the plurality of upconverted signals after analog coding to the plurality of power amplifiers, wherein the number of analog coding modules equals the number of antennas of the plurality of antenna arrays.

Figure 10:
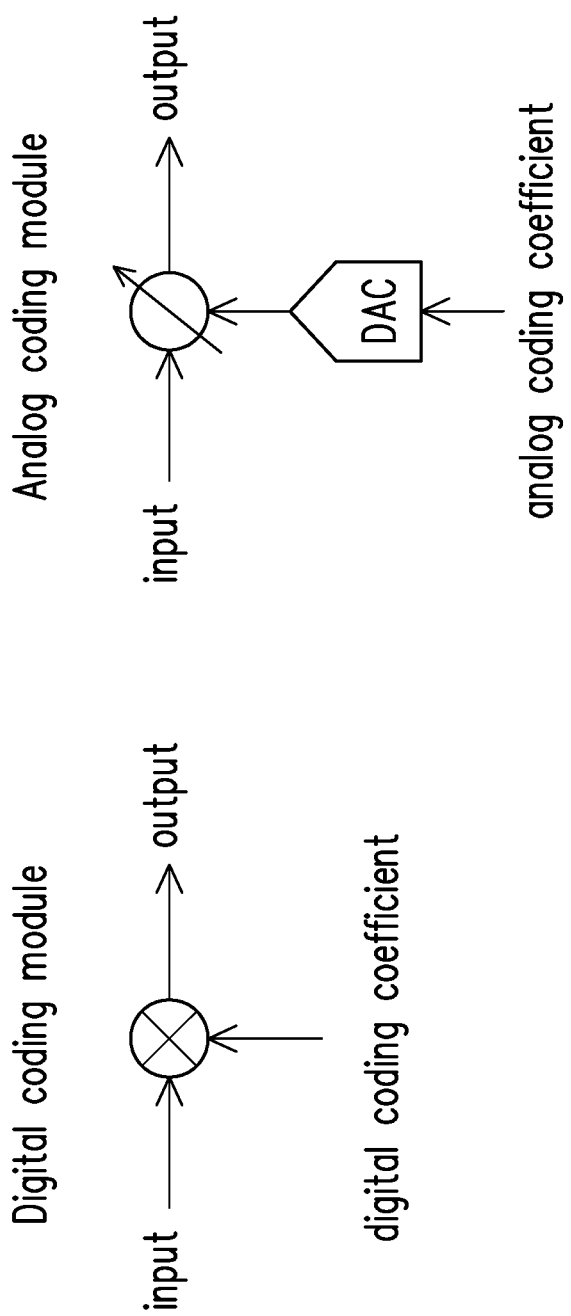
FIG. 10 illustrates a digital coding module and an analog coding module according to one of the exemplary embodiments of the disclosure.

FIG. 10 illustrates a digital coding module and an analog coding module according to one of the exemplary embodiments of the disclosure. The digital coding module has an input. Digital coding is performed by multiplying the input with a digital coding coefficient. The product of the input and the digital coding coefficient is the output of the digital coding module. In several embodiments of the disclosure, the digital coding coefficient may be a sequence, including but not limited to an orthogonal sequence, a Hadamard sequence, a Walsh sequence, etc. Additionally, the digital coding module may be implemented by a processor. For example, the digital coding module may be implemented by the hardware processor of FIG. 8.

The analog coding module may be an analog circuit comprising a DAC and an input. The DAC may receive the analog coding coefficient and output an analog signal according to the analog coding coefficient. The analog coding module may perform analog coding on the input according to the analog signal, and output a coded signal. For example, the analog coding module may cause a phase shift on the input. In other words, the analog coding module may be a phase shifter. According to one of the exemplary embodiments of the disclosure, a plurality of analog coding modules may be a plurality of phase shifters, which may perform the second layer of coding and the second layer of a scrambling sequence.

Figure 11:
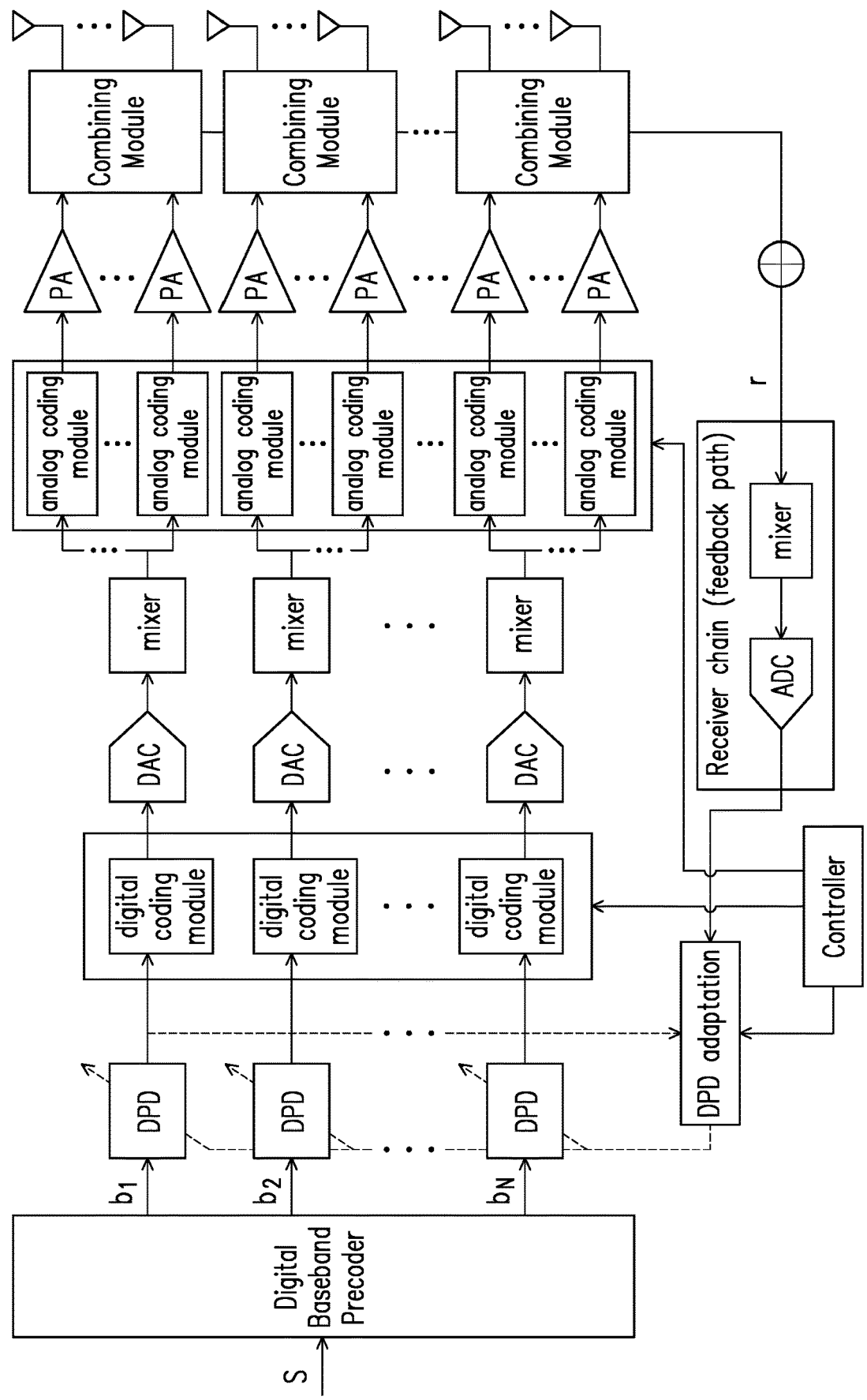
FIG. 11 illustrates a transmitter of a communication system using hybrid digital/analog beamforming, configured to perform a code division feedback method for digital pre-distortion DPD according to one of the exemplary embodiments of the disclosure.

FIG. 11 illustrates a transmitter of a communication system using hybrid digital/analog beamforming, configured to perform a code division feedback method for digital pre-distortion DPD according to one of the exemplary embodiments of the disclosure. FIG. 11 is similar to FIG. 9. The difference is that the transmitter of FIG. 11 comprises a plurality of combining modules, while the transmitter of FIG. 9 comprises a combining module.

The digital baseband precoder, the plurality of DPD modules, the plurality of digital coding modules, the plurality of DACs, the plurality of mixers, the plurality of analog coding modules, the plurality of PAs, the plurality of antenna arrays, the receiver chain, the mixer and the ADC of the receiver chain, the DPD adaptation module and the controller of FIG. 11 are similar to those in FIG. 9. Description of these components may be found in the description of FIG. 9.

Similar to FIG. 9, the plurality of combining modules of FIG. 11 may receive the plurality of transmit signals from the plurality of antenna arrays, combine the plurality of transmit signals, and output a combined feedback signal r. However, there is a plurality of combining modules. Thus, there is no combining module which is directly connected to all the antenna arrays. In FIG. 11, a combining module of the plurality of combining modules may be directly connected to one antenna array. Therefore, the number of combining modules equals the number of antenna arrays.

Figure 12:
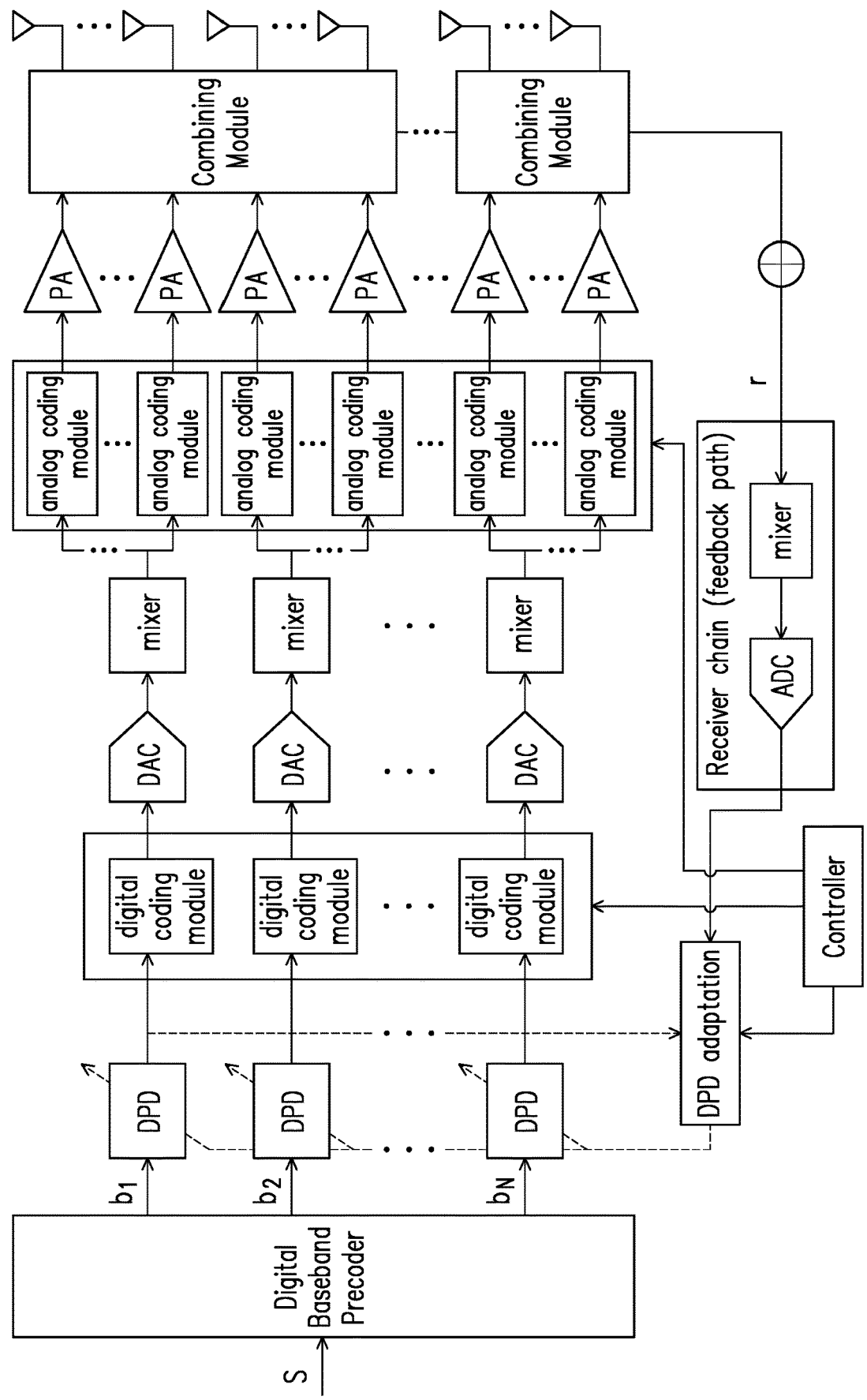
FIG. 12 illustrates a transmitter of a communication system using hybrid digital/analog beamforming, configured to perform a code division feedback method for digital pre-distortion DPD according to one of the exemplary embodiments of the disclosure.

FIG. 12 illustrates a transmitter of a communication system using hybrid digital/analog beamforming, configured to perform a code division feedback method for digital pre-distortion DPD according to one of the exemplary embodiments of the disclosure. FIG. 12 is similar to FIG. 11. The difference is that, in FIG. 12, a combining module of the plurality of combining modules may be directly connected to one, two, three or other number of antenna arrays. A combining module of the plurality of combining modules may be directly connected to more antenna arrays, or to less antenna arrays. In other words, the combining modules may not be directly connected to the same amount of antenna arrays. Description about the plurality of combining modules regarding other aspects may be found in the description of FIG. 11.

The digital baseband precoder, the plurality of DPD modules, the plurality of digital coding modules, the plurality of DACs, the plurality of mixers, the plurality of analog coding modules, the plurality of PAs, the plurality of antenna arrays, the receiver chain, the mixer and the ADC of the receiver chain, the DPD adaptation module and the controller of FIG. 12 are similar to those in FIG. 9. Description of these components may be found in the description of FIG. 9.

Figure 13:
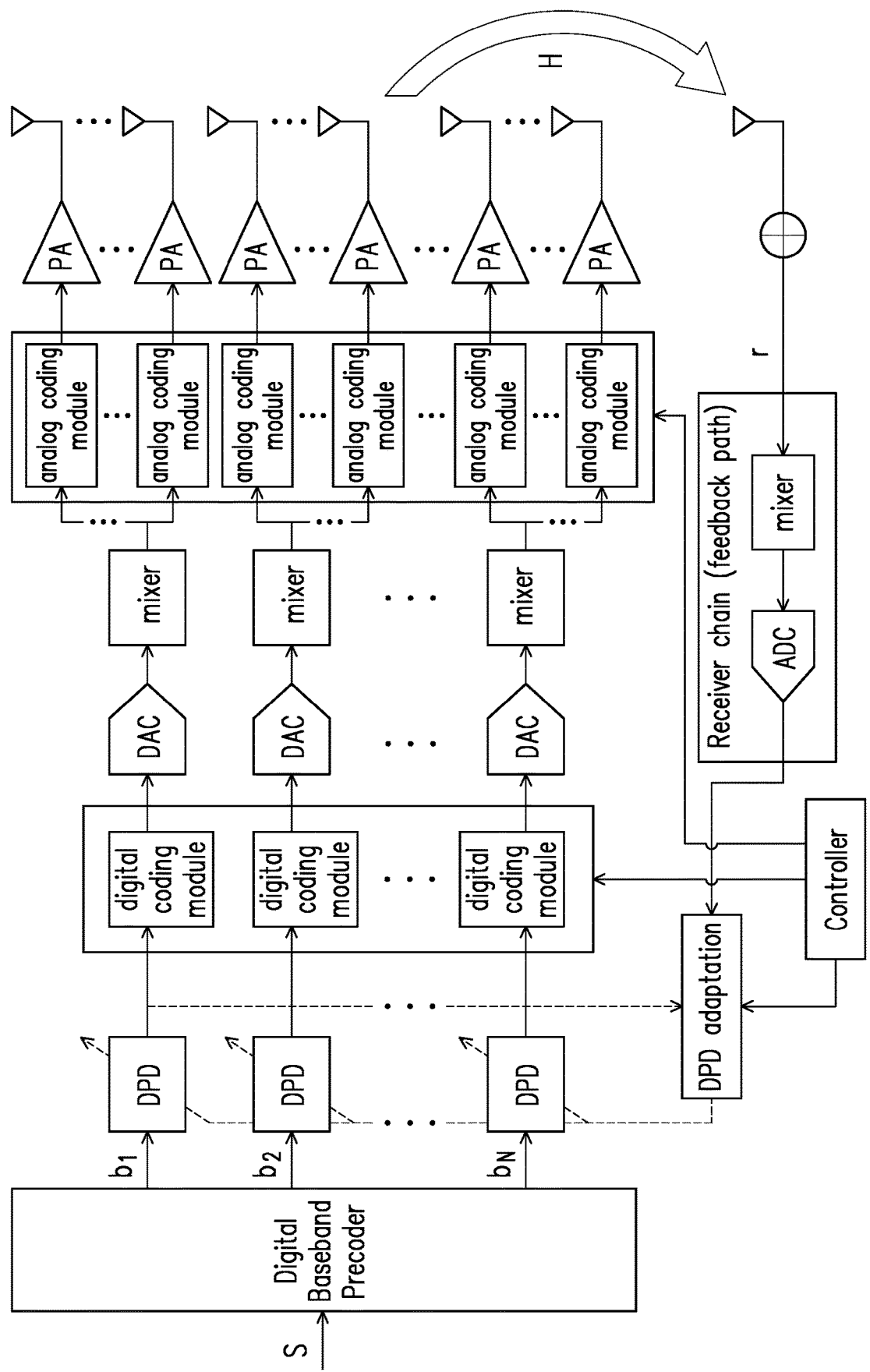
FIG. 13 illustrates a transmitter of a communication system using hybrid digital/analog beamforming, configured to perform a code division feedback method for digital pre-distortion DPD according to one of the exemplary embodiments of the disclosure.

FIG. 13 illustrates a transmitter of a communication system using hybrid digital/analog beamforming, configured to perform a code division feedback method for digital pre-distortion DPD according to one of the exemplary embodiments of the disclosure. FIG. 13 is similar to FIGS. 9, 11 and 12. The difference is that, in FIG. 13, the transmitter may further comprise a combining antenna at the receiver chain, instead of the plurality of combining modules. The combining antenna may receive the combined feedback signal r through the wireless channel H.

The digital baseband precoder, the plurality of DPD modules, the plurality of digital coding modules, the plurality of DACs, the plurality of mixers, the plurality of analog coding modules, the plurality of PAs, the plurality of antenna arrays, the receiver chain, the mixer and the ADC of the receiver chain, the DPD adaptation module and the controller of FIG. 12 are similar to those in FIG. 9. Description of these components may be found in the description of FIG. 9.

In FIG. 13, given a composite PA response p, scrambling sequence c and input baseband signal s, the feedback signal r may be expressed as $r = c \cdot p \cdot H \cdot s$. Thus, if the PA works in a linear area, the DPD adaptation module can compute the wireless channel H. After computing H and p, the DPD adaptation module may adjust the DPD module to cancel the distortion.

Additionally, H may already be known at the receiver chain. Since the distance between the antennas of the antenna arrays is fixed and is short, H may be measured after the transmitter is manufactured.

Thus, in several embodiments of the disclosure, the plurality of combining modules are implemented at the outputs of the plurality of power amplifiers, or are implemented as a combining antenna at the receiver chain.

In view of the aforementioned descriptions, the disclosure is suitable for being used in a transmitter with many antenna arrays, using hybrid digital/analog beamforming and configured to perform DPD. In a system with many antenna arrays, a receiver chain would be required for each antenna array. This requirement would result in increased hardware complexity and cost. The transmitter of the disclosure may comprise one single feedback circuit that may combine the feedback signals from the antenna arrays into one combined feedback signal. The feedback circuit is able to recover the signals output by the antenna arrays because the feedback circuit performs a code division method. Thus, the transmitter of the disclosure may perform DPD while reducing feedback circuit hardware complexity and cost.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A transmitter of a communication system using hybrid digital/analog beamforming, configured to perform a code division feedback method for digital pre-distortion (DPD), the transmitter comprising:
   a processor, outputting a plurality of digital baseband signals;
   a plurality of digital-to-analog converters (DAC), coupled to the processor, receiving the plurality of digital baseband signals and outputting a plurality of analog baseband signals;
   a plurality of mixers, coupled to the plurality of DACs, receiving the plurality of analog baseband signals, performing frequency upconversion, and outputting a plurality of upconverted signals;
   a plurality of power amplifiers, amplifying the plurality of upconverted signals, and outputting a plurality of transmit signals, wherein the plurality of power amplifiers causes distortion of the plurality of transmit signals;
   a plurality of antenna arrays, coupled to the plurality of power amplifiers, receiving the plurality of transmit signals, and transmitting the plurality of transmit signals;
   a plurality of combining modules, coupled to the plurality of antenna arrays, receiving the plurality of transmit signals, combining the plurality of transmit signals, and outputting a combined feedback signal; and
   a receiver chain, coupled to the plurality of combining modules, receiving the combined feedback signal, converting the combined feedback signal to a digital feedback signal, and outputting the digital feedback signal to the processor,
   wherein the processor is configured to execute a plurality of modules, the plurality of modules comprising:
      a plurality of DPD modules, performing DPD on the plurality of digital baseband signals to compensate the distortion caused by the plurality of power amplifiers;
      a DPD adaptation module, receiving the digital feedback signal, and adjusting the DPD performed by the plurality of DPD modules;
      a controller, controlling the DPD adaptation module; and
      a plurality of coding modules, receiving a plurality of scrambling sequences from the controller, wherein a coding module of the plurality of coding modules multiplies a digital baseband signal of the plurality of digital baseband signals by a scrambling sequence of the plurality of scrambling sequences, and the plurality of coding modules outputs the plurality of digital baseband signals after performing multiplication,
   wherein the DPD adaptation module computes the plurality of transmit signals from the digital feedback signal according to the plurality of scrambling sequences and executes DPD processing for each digital baseband signal of the plurality of digital baseband signals,
   wherein the number of digital baseband signals equals the number of antenna arrays.

2. The transmitter of claim 1, wherein the plurality of scrambling sequences is a plurality of Hadamard sequences or Walsh sequences.

3. The transmitter of claim 1, wherein a plurality of digital coding modules is the plurality of coding modules, and the transmitter further comprises:
- a plurality of analog coding modules, coupled to the mixers, performing analog coding on the plurality of upconverted signals, and outputting the plurality of upconverted signals after analog coding to the plurality of power amplifiers,
- wherein the number of analog coding modules equals the number of antennas of the plurality of antenna arrays.

4. The transmitter of claim 1, wherein the DPD adaptation module computes the plurality of transmit signals from the digital feedback signal according to a plurality of orthogonal scrambling sequences, and generates DPD compensation signal.

5. The transmitter of claim 1, wherein the plurality of combining modules are implemented at the outputs of the plurality of power amplifiers, or are implemented as a combining antenna at the receiver chain.

6. The transmitter of claim 3, wherein the plurality of analog coding modules is a plurality of phase shifters.

7. The transmitter of claim 4, wherein the combined feedback signal is transformed to beam domain for processing.

8. The transmitter of claim 1, wherein the receiver chain comprises:
- a mixer, receiving the combined feedback signal to perform frequency downconversion; and
- an analog-to-digital converter (ADC), receiving, from the mixer, the combined feedback signal after downconversion to convert into the digital feedback signal, and outputting the digital feedback signal.

* * * * *